United States Patent
Christensen

[15] 3,665,705
[45] May 30, 1972

[54] THERMAL ENGINES

[72] Inventor: Edwin S. Christensen, 2203 North Santa Fe Avenue, Compton, Calif. 90222

[22] Filed: Nov. 10, 1969

[21] Appl. No.: 875,088

[52] U.S. Cl. ............................................................. 60/23
[51] Int. Cl. ......................................................... F03g 7/06
[58] Field of Search ............... 60/23; 251/11; 236/68; 73/363

[56] References Cited

UNITED STATES PATENTS 984,579    2/1911    Marti ........................................ 60/23

Primary Examiner—Martin P. Schwadron
Assistant Examiner—Allen M. Ostrager
Attorney—Nilsson, Robbins, Wills & Berliner

[57] ABSTRACT

A thermal engine capable of converting heat directly into rotary motion and having only one prime moving part. A cylindrical rotor member is rotatably supported between trunnioned bearings so that longitudinal deformation of the rotor is limited to a predetermined direction. Heat is applied to the rotor offset from such direction and in attempting to deform in response to the applied heat, the rotor rotates about its longitudinal axis toward the such direction where the trunnioned bearings permit such deformation. Once in this position, the heated portion cools and returns to a non-deformed state while a new portion of the rotor is deformed by the applied heat to thereby obtain continuous rotation.

7 Claims, 3 Drawing Figures

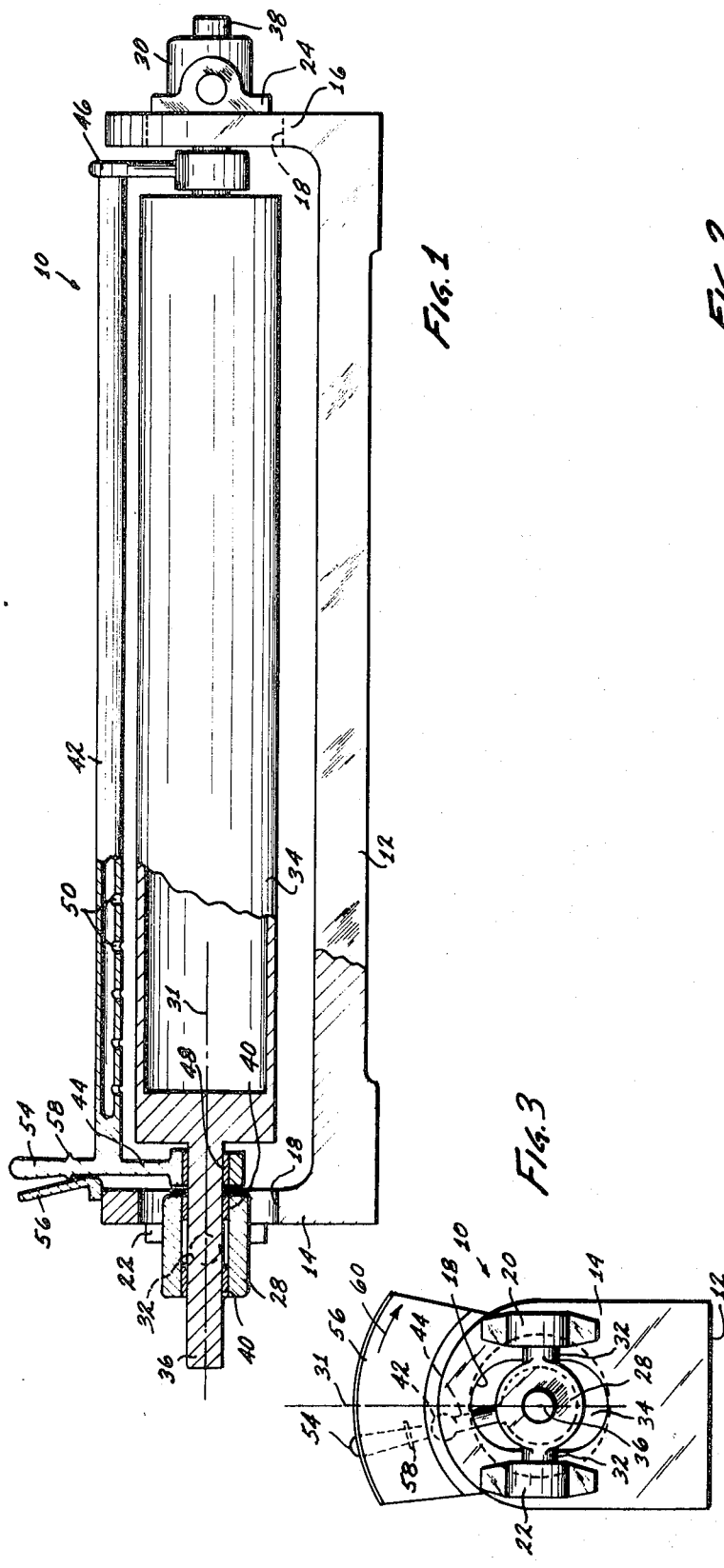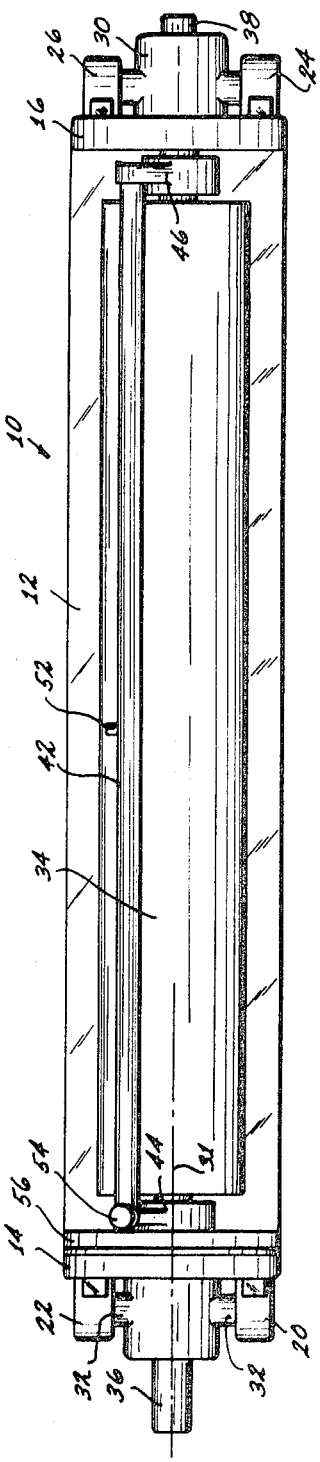
INVENTOR
EDWIN S. CHRISTENSEN
by Nilsson + Robbins
ATTORNEYS

THERMAL ENGINES

BACKGROUND OF THE INVENTION

1. Field of the Invention

The field of art to which the invention pertains includes the field of rotary power plants.

2. Description of the Prior Art

A variety of thermal engines have been proposed for converting various forms of heat into mechanical motion. By utilizing only heat as the driving force, one can accomodate such engines to a variety of environments. Almost any source of energy available at a particular environment is readily convertible into heat for subsequent conversion into rotary motion by a thermal engine. Without a thermal engine only those forms of energy suitable for directly driving a rotor or which are combustible would be capable of utilization. On the other hand, prior thermal engines have generally required complex structures and expensive installations and are generally unable to develop sufficient power to be useful in industrial applications.

SUMMARY OF THE INVENTION

The present invention provides a thermal engine which can provide high speed and/or high torque rotational motion utilizing a wide variety of energy sources. Heat is obtained from any source suitable to the environment. Electric current, open fire, gas or liquid combustion, liquid metal flow (as from an atomic pile) etc., can be utilized. Specifically, an elongated cylindrical rotor member is provided, which rotor tends to longitudinally deform or bow in the direction of a temperature differential between opposite longitudinal sides thereof. Such temperature differential can be obtained by applying heat to one longitudinal side of the rotor. An elongated heater can be disposed parallel to the rotor for this purpose. The rotor is journaled within bearings that are carried by a pair of trunnions. The trunnions are journaled within rigidly disposed bearings having axes normal to the axes of the first-mentioned bearings. By such means, longitudinal deformation or bowing of the cylindrical member is limited to the direction in which the first-mentioned bearings can pivot on its trunnions. Heat is applied offset from such direction. The rotor tends to bow in the direction of the applied heat but is prevented from so doing by the limiting effect of the rigidly disposed trunnion bearings. Forces generated within the rotor cause it to rotate until its deformation or bowing plane coincides with the direction of trunnion pivot where pivoting of the rotor relieves stresses built up by the temperature differential. At such point, however, a new portion of the rotor is heated and the rotor is again bowed and rotated to provide continuous motion thereto.

The direction in which the rotor is allowed to pivot on its trunnions defines a center line. The greater the angular displacement of the applied heat from the center line, the higher the speed obtainable, with top speed being obtained at a 45° displacement. The closer the angular displacement of the applied heat to the center line, the greater the torque obtained from the engine. To reverse the direction of rotation, one need merely move the applied heat to the quadrant on the opposite side of the center line. Means are provided enabling ready movement of the heat means. Specifically, an elongated heater is disposed parallel to the rotor and pivotable thereabout. The rotor can be provided with shafts on each end around which the heater can be journaled. Means can be provided for maintaining the heater in a desired rotational position.

BRIEF DESCRIPTION OF THE DRAWINGS

FIG. 1 is a side elevational, partially sectional view of a thermal engine of this invention;

FIG. 2 is a top plan view of the device of FIG. 1; and

FIG. 3 is a front plan view of the device of FIG. 1.

DESCRIPTION OF THE PREFERRED EMBODIMENTS

Referring to FIGS. 1, 2 and 3, a thermal engine 10 is shown and comprises an elongated rigid base frame 12 having upstanding end portions 14 and 16 vertically projecting from opposite ends thereof. Both ends of the base frame are identical, FIG. 1 showing the left end thereof in vertical section. Each end portion 14 and 16 defines an elliptical opening 18 (FIG. 3) having its long axis normal to the base 12. Pairs of confronting bearing assemblies 20, 22 and 24, 26 are rigidly secured on the end portions 14 and 16, respectively, adjacent opposite long sides of the elliptical openings 18. A rotor bearing assembly 28 is disposed between the bearings 20 and 22 on the left end portion 14 and an identical rotor bearing assembly 30 is similarly disposed between the bearings 24 and 26 affixed to the right end portion 16. Each rotor bearing assembly 28 and 30 is pivotally supported between its respective pair of end portion bearing assemblies by means of trunnions 32 thereon. The trunnions 32 are disposed on each rotor bearing assembly and journaled within the rigidly disposed bearing assemblies 20, 22, 24 and 26 so that the rotor bearing assemblies 28 and 30 pivot about an axis drawn through each respective pair of end portion bearing assemblies 20, 22 and 24, 26.

An elongated cylindrical rotor 34, which can be a hollow aluminum tube, is supported between the end portions 14 and 16 by means of end shafts 36 and 38 thereon that are journaled within the rotor bearing assemblies 28 and 30, respectively, on bearings 40 there within.

By means of the foregoing bearing assembly and trunnion arrangement, the only freedoms of movement of the cylindrical rotor 34 are (a) rotation about an axis drawn between the rotor bearing assemblies 28 and 30, and (b) movement along a vertical plane perpendicular to the base 12 when the rotor 34 is bowed away from the base so that its end shafts 36 and 38 pivot on the trunnions 32.

The rotor 34 is caused to bow by applying heat along its length or at a point midway between its ends, convexity occurring on the side of the rotor 34 adjacent the source of heat. Alternatively, one may drastically cool one side of the rotor 34 to cause bowing with concavity on the cooled side. In still other alternative embodiments, one may heat or cool the rotor from within, for example, by means of an elongated heating or cooling device located off-center within the rotor 34 or by a series of such devices disposed around the inner perimeter of the rotor 34 and selectively energized to provide bowing in a desired direction.

In the present embodiment, the heating unit is an elongated rod-like member 42 disposed parallel to the rotor 34 and supported by extensions 44 and 46 which are journaled by bearings 48 around the respective end shafts 36 and 38. The heating unit 42 may be electrically heated or may merely be a hollow conduit for gas, such as acetylene, and provided with holes 50 therein directed toward the rotor 34 so that upon ignition, flame may be applied to the rotor 34. Acetylene, or other such gas, can be introduced through a centrally disposed tube 52 (FIG. 2) and attached rubber tubing (not shown).

The foregoing arrangement allows the heating unit 42 to swing around the perimeter of the cylindrical rotor 34. A lever extension 54 is provided at one end of the heating unit for this purpose. A resilient collar 56 disposed atop the base end portion 14 at that end bears against a flange 58 on the lever extension 54 to thereby hold the heating unit 42 in a desired position with respect to the rotor 34.

Initially, the heating unit 42 is disposed along the vertical plane in which the rotor 34 can pivot when bowed, i.e., the heater 42 is located along a centerline 31 that bisects the axis around which the trunnions 32 would pivot. If heat is applied in this position, bowing of the rotor 34 occurs but the rotor does not rotate since the end shafts 36 and 38 can pivot directly in the direction of bowing by means of the trunnions 32. However, if the heating unit 42 is pivotally displaced on one or the other side of the centerline 31, and heat is applied to the rotor 34 in the thus offset position, then the rotor 34 tends to deform, or bow outwardly toward the heating unit 42. This tendency is resolved, by the relationship of the shaft bearings 40 and trunnions 32, into rotation of the bowed portion toward the vertical plane or centerline 31 in which the trunnion bearing assemblies 20, 22 and 24, 26 allow the end shafts 36 and 38, respectively, to pivot. Thus, forces generated in a horizontal plane of the rotor 34 cause the rotor 34 to rotate until it is bowed in the vertical plane to relieve the stresses. At such point, however, a new, cooler spot or portion of the rotor 34 is beneath the heating unit 42 and again the tube tends to bow in that direction and rotate. The foregoing process continues until the rotor 34 achieves a rotational speed determined by the displacement of the heating unit 42 from the centerline 31. Referring specifically to FIGS. 2 and 3, placing the lever 54 in the quadrant left of the centerline 31 results in clockwise rotation as indicated by the arrow 60. If the lever 54 is placed in the opposite quadrant, then the application of the heat and bowing of the rotor 34 causes rotation in a counter-clockwise direction. The greater the displacement of the heating unit 42 from the centerline 31, up to 45°, the greater the speed and lower the torque. Higher torque is obtained with the heating unit 42 closer to the centerline 31.

It can be seen that the present engine has only one prime moving part, the rotor 34. Heat is applied directly to the rotor 34 and rotary motion is produced immediately without requiring pistons, valves or timing gears. Either end shaft 36 or 38 can be linked directly to a useable load. For example, an engine of suitable size can be attached directly, with no gearing, secondary transmissions or gear trains, to the end of a propeller shaft in a submarine to provide silent power.

A single rotor of appropriate size for any particular application can be utilized. Alternatively, a plurality of rotors can be disposed around one or more heating units that are positioned with respect to trunnion support thereof so that heat is applied offset with respect to each of the rotors to provide rotation thereto. In this case, gearing and linkages can be utilized, as known in the art, to couple the rotors together and provide higher torque.

I claim:
1. A thermal engine comprising:
an elongate hollow rotor means of heat deformable material, defining elongate sides parallel to a longitudinal axis;
heat transfer means for accomplishing a temperature differential between different of said elongate sides of said rotor means;
means for supporting said rotor means for rotation about the longitudinal axis thereof;
and
means for limiting the deformation of said rotor to bow outwardly normal to said longitudinal axis, whereby to rotate said rotor so as to accommodate the deformation thereof resulting from said temperature differential.

2. A thermal engine according to claim 1, wherein said elongate hollow rotor comprises an elongate metallic cylinder.

3. A thermal engine according to claim 1, wherein said heat transfer means comprises a heat source means affixed to extend substantially parallel to said longitudinal axis for supplying heat to an elongate section of said rotor parallel to said longitudinal axis.

4. A thermal engine according to claim 1, wherein said means for supporting said rotor comprises bearing means affixed at the ends of said rotor and shaft means extending from said rotor to be received in said bearing means.

5. A thermal engine according to claim 4, wherein said means for limiting the deformation of said rotor to bow, comprises trunnion means normal to said longitudinal axis.

6. A thermal engine according to claim 1, wherein said means for supporting said rotor includes a base frame including bearing means and shaft means extending from said elongate hollow rotor received in said bearing means; and wherein said means for limiting the deformation of said rotor includes trunnion means extending normal to said longitudinal axis.

7. A thermal engine according to claim 1, wherein said heat transfer means includes variable positioning means whereby said heat transfer means may be displaced to various positions about said hollow rotor means parallel to said longitudinal axis.

* * * * *